Figure 1:
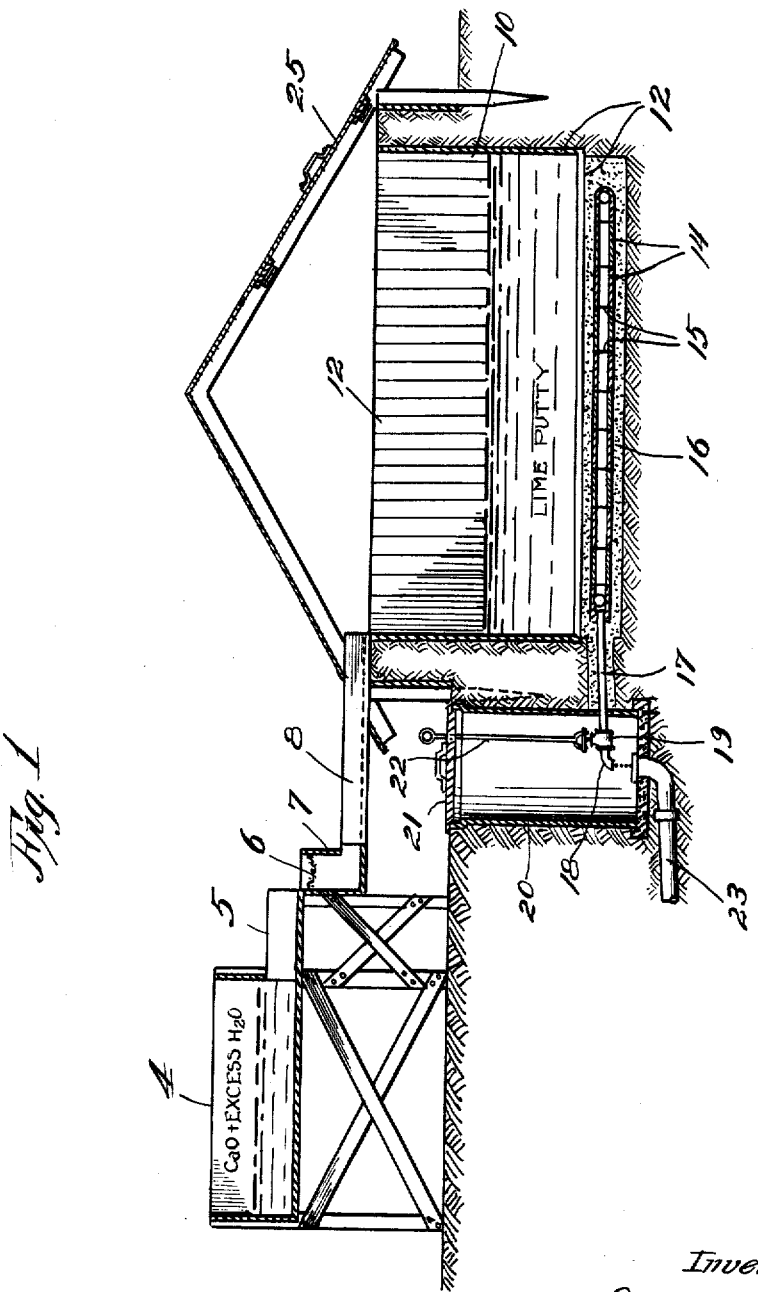

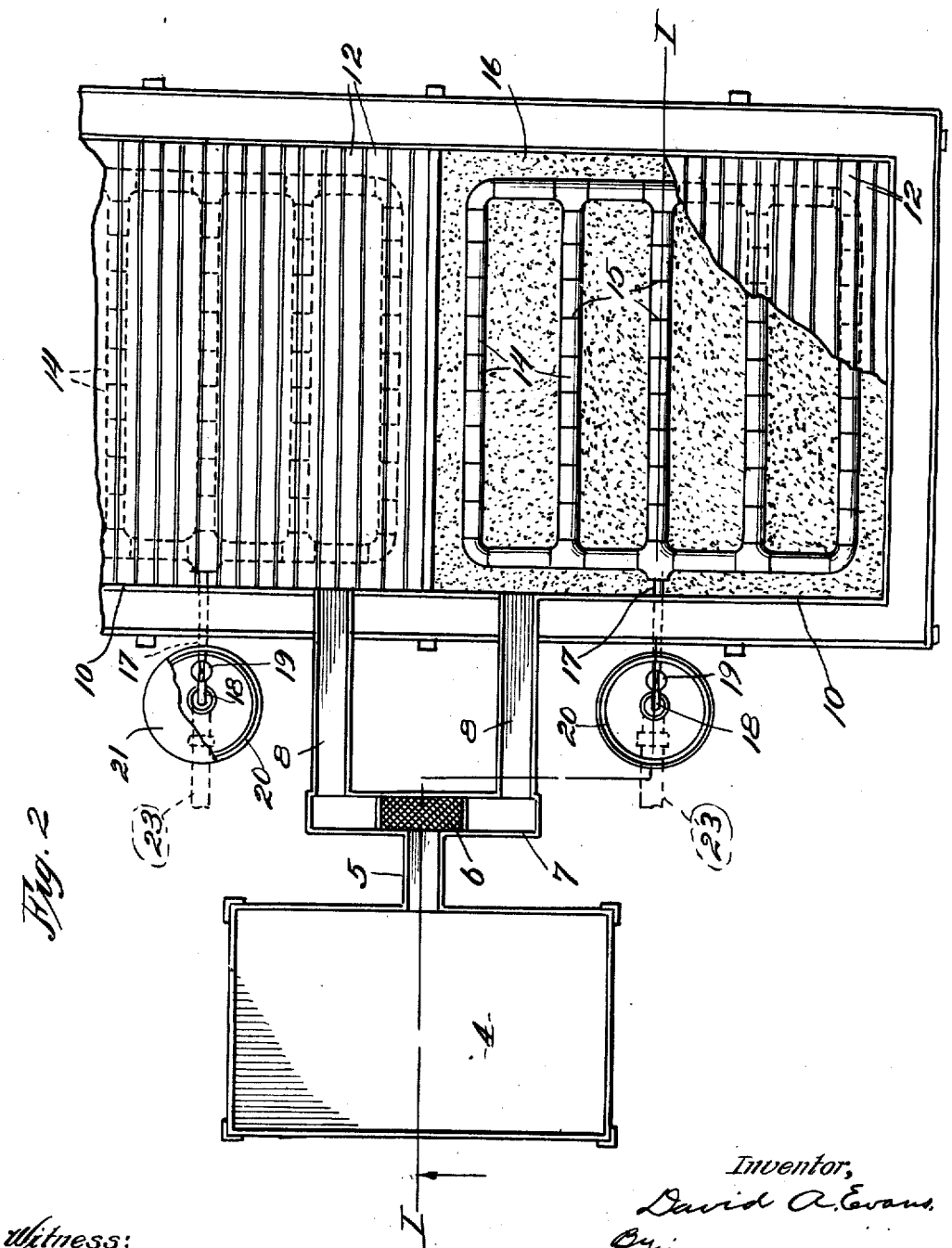

Patented Dec. 22, 1925.

1,566,587

UNITED STATES PATENT OFFICE.

DAVID A. EVANS, OF KANSAS CITY, MISSOURI, ASSIGNOR, BY MESNE ASSIGNMENTS, OF FIFTY-ONE ONE-HUNDREDTHS TO THE EVANS LIME PUTTY COMPANY, OF KANSAS CITY, KANSAS, A CORPORATION OF KANSAS.

PROCESS OF SLAKING LIME INTO LIME PUTTY.

Application filed December 1, 1924. Serial No. 753,179.

*To all whom it may concern:*

Be it known that I, DAVID A. EVANS, a citizen of the United States, and a resident of Kansas City, county of Jackson, State of Missouri, have invented a certain new and useful Improvement in Processes of Slaking Lime into Lime Putty, of which the following is a complete specification.

The present invention relates to improvements in methods and equipments used in the manufacture of lime putty, and has for its principal object to devise a more efficient method or process of slaking lime into lime putty for the purpose of obtaining a more uniform product of superior quality, as well as a clear-grade, saturated solution of lime water formed as a by-product in this manufacture.

The fundamental feature of improvement which characterizes this new method or process is the curing of the putty mass by allowing the water to settle to the bottom of the mass, where the excess water is withdrawn. In this connection, a further improvement resides in the filtering of the excess water as it is withdrawn, and regulating the discharge flow for obtaining the most efficient operation of the process.

It is also sought to devise a practical and efficient apparatus or equipment suitable for the practice of the improved method or process in a satisfactory and economical manner.

With these general objects in view, the invention will now be described by reference to the accompanying drawings, illustrating one form of equipment or apparatus which I have found to be efficient and entirely practical for the practice of my new and improved process, after which those features and combinations deemed to be novel will be particularly set forth and claimed.

In the drawings—

Figure 1 is a sectional elevation illustrating a lime slaking and putty curing plant constructed in accordance with the present invention, said view representing a section on the line I—I of Figure 2; and Figure 2 is a plan view of the same.

Referring now to said drawings in detail, the form of plant illustrated is shown as comprising a mixing box 4 designed to receive the mixture of lime and water by which the usual hydrating step of the lime slaking process is carried out. This box 4 discharges through a run-off trough 5 onto a screen 6 mounted in a distributing trough 7, which discharges into a set of run-off troughs 8, which in turn discharge into a corresponding number of vats 10 where the raw lime putty is subjected to the necessary curing and dewatering action.

Each of the vat compartments may simply comprise a pit of suitable depth below the ground level, with the sides and bottom of the pit lined with lumber 12 or other appropriate material of proper dimensions. Beneath the flooring forming the bottom of the vat is laid a network of drain conduits, such as porous drain tile 14 or the like, having their joints sealed as indicated at 15, these conduits being imbedded in sand or similar filtering material 16 at the bottom of each pit. Each set of conduits 14 is tapped and drained off by a lime-water drain pipe 17 of non-porous material, and provided with spigot 18 and valve 19 at its discharge end, which may be located inside a man-hole 20 fitted with a cover 21 at the ground level; the valve 19 may be conveniently regulated by a tool 22 let down through the cover 21. From the spigot 18 the lime water may be conducted away by a conduit 23 to any suitable vat or cistern (not shown) designed as a reservoir for the lime water.

In carrying out the process of slaking lime into lime putty, the lime and water are placed in the box 4, and there mixed and vigorously stirred until the hydration is for the most part complete. As the material is discharged from the box 4 through the trough 5, any coarser unslaked material is arrested by the screen 6 and held back for further slaking, until it can be passed through the screen. From this point the raw lime putty flows on through the troughs 8 into the vats 10 for curing and the necessary dewatering.

Now in the slaking of lime, there is practically always present a certain amount of fine gravelly material which will not slake for some time, usually around ten days, after the slaking of the principal lime content itself has been completed. Hence, this renders it necessary to age or cure the lime putty for a sufficient period of time to effect an entirely uniform slaking action throughout the lime putty mass.

Heretofore, in the practice of curing lime putty, the excess water has been removed by allowing it to overflow through holes or openings in the upper portion of the side walls of the vat, or by siphoning the water over the top of the walls. That is to say, the prevailing practice has been to draw off the excess water from the surface of the lime putty material in the vat. With such a method, the lime content which has been only partly slake, being heavier than the fully slaked putty, has a tendency to settle to the bottom of the vat, where it continues to take up water. Now if there is not sufficient water available to support this continued slaking action, the immediately surrounding mass will heat up to an injurious extent and form a more or less dry hydrate lacking the proper plastic properties which the putty should possess. To the extent that this takes place, a putty of inferior quality is of course produced, since the insufficiently slaked particles of the putty will, when used later, undergo an air-slaking action, and if this takes place on a wall surface (where it is called "popping") it burns and fades out the finish, or the paper or other decorations on the wall.

By means of the improved process, this objectionable feature is entirely overcome because of the fact that the excess water is not taken off at the surface, but can only be discharged by filtering down through the whole mass slowly to the bottom, or as fast as permitted by regulation of the valve 19. In this way, a continuous water supply is furnished to all parts of the putty mass, so that every particle of the mixture of lime and lime salt will be efficiently and thoroughly hydrated, and any possibility of the lime and gravel burning for lack of water is entirely eliminated. Since lime rocks vary so greatly in different parts of the country, some being slower and hotter in slaking than others, this process is of great importance in making it possible to manufacture a uniform and superior putty product of excellent quality from these various grades of material, some of which are of such an inferior character as to be practically useless for plaster purposes if prepared by the old methods.

When the putty mass has sufficiently aged and cured, the putty is removed from time to time by being shovelled out through the doors 25 from the vat; the lime water solution being drawn off by way of the conduit 23, either for further use in slaking new lime, or as a by-product of the manufacture which is also of a superior quality because of its uniform saturated character and clear quality due to being passed through the filter structure forming the bottom of the vat.

It is thus apparent that I have devised an improved and highly efficient method of slaking lime into a uniform high-grade putty product with a similarly superior quality of lime water solution as its by-product, together with a practical form of equipment or apparatus for carrying said method into practice; and while I have described what I now regard as the preferred mode of practicing the invention, I desire to reserve the right to make all such changes or modifications as may fairly fall within the scope of the appended claims.

What I claim is:

1. The process of curing lime putty which consists in allowing the putty mass, containing an excess of water, to settle until water has completely saturated the whole mass, and removing the excess water from the bottom of the mass.

2. The process of putty manufacture which consists in mixing lime and water and effecting substantially complete hydration of the lime, and then running the mixture, containing an excess of water for hydrating purposes, into a settling vat, and allowing the mass to cure until a uniform slaking has taken place throughout the same, while removing the excess water from the bottom of the mass.

3. The process of curing lime putty which consists in allowing water to settle through the putty mass, and filtering the excess water as it discharges from the bottom of the mass.

4. The process of curing lime putty which consists in supplying water to the surface of the putty mass and allowing it to settle through the mass, and regulating the flow of excess water as it discharges from the bottom of the mass.

In witness whereof I hereunto affix my signature.

DAVID A. EVANS.

Heretofore, in the practice of curing lime putty, the excess water has been removed by allowing it to overflow through holes or openings in the upper portion of the side walls of the vat, or by siphoning the water over the top of the walls. That is to say, the prevailing practice has been to draw off the excess water from the surface of the lime putty material in the vat. With such a method, the lime content which has been only partly slake, being heavier than the fully slaked putty, has a tendency to settle to the bottom of the vat, where it continues to take up water. Now if there is not sufficient water available to support this continued slaking action, the immediately surrounding mass will heat up to an injurious extent and form a more or less dry hydrate lacking the proper plastic properties which the putty should possess. To the extent that this takes place, a putty of inferior quality is of course produced, since the insufficiently slaked particles of the putty will, when used later, undergo an air-slaking action, and if this takes place on a wall surface (where it is called "popping") it burns and fades out the finish, or the paper or other decorations on the wall.

By means of the improved process, this objectionable feature is entirely overcome because of the fact that the excess water is not taken off at the surface, but can only be discharged by filtering down through the whole mass slowly to the bottom, or as fast as permitted by regulation of the valve 19. In this way, a continuous water supply is furnished to all parts of the putty mass, so that every particle of the mixture of lime and lime salt will be efficiently and thoroughly hydrated, and any possibility of the lime and gravel burning for lack of water is entirely eliminated. Since lime rocks vary so greatly in different parts of the country, some being slower and hotter in slaking than others, this process is of great importance in making it possible to manufacture a uniform and superior putty product of excellent quality from these various grades of material, some of which are of such an inferior character as to be practically useless for plaster purposes if prepared by the old methods.

When the putty mass has sufficiently aged and cured, the putty is removed from time to time by being shovelled out through the doors 25 from the vat; the lime water solution being drawn off by way of the conduit 23, either for further use in slaking new lime, or as a by-product of the manufacture which is also of a superior quality because of its uniform saturated character and clear quality due to being passed through the filter structure forming the bottom of the vat.

It is thus apparent that I have devised an improved and highly efficient method of slaking lime into a uniform high-grade putty product with a similarly superior quality of lime water solution as its by-product, together with a practical form of equipment or apparatus for carrying said method into practice; and while I have described what I now regard as the preferred mode of practicing the invention, I desire to reserve the right to make all such changes or modifications as may fairly fall within the scope of the appended claims.

What I claim is:

1. The process of curing lime putty which consists in allowing the putty mass, containing an excess of water, to settle until water has completely saturated the whole mass, and removing the excess water from the bottom of the mass.

2. The process of putty manufacture which consists in mixing lime and water and effecting substantially complete hydration of the lime, and then running the mixture, containing an excess of water for hydrating purposes, into a settling vat, and allowing the mass to cure until a uniform slaking has taken place throughout the same, while removing the excess water from the bottom of the mass.

3. The process of curing lime putty which consists in allowing water to settle through the putty mass, and filtering the excess water as it discharges from the bottom of the mass.

4. The process of curing lime putty which consists in supplying water to the surface of the putty mass and allowing it to settle through the mass, and regulating the flow of excess water as it discharges from the bottom of the mass.

In witness whereof I hereunto affix my signature.

DAVID A. EVANS.

Certificate of Correction.

It is hereby certified that Letters Patent No. 1,566,587, granted December 22, 1925, upon the application of David A. Evans, of Kansas City, Missouri, for an improvement in "Processes of Slaking Lime into Lime Putty," were erroneously issued to the inventor and The Evans Lime Putty Company, as assignee, by mesne assignments, of fifty-one one-hundredths of said invention, whereas said Letters Patent should have been issued to *The Evans Lime Putty Company, of Kansas City, Kansas, a Corporation of Kansas, as assignee, by direct and mesne assignments,* of the *entire interest* in said invention; in the drawings, Sheet 2, at the bottom, for the signatures insert *Inventor, David A. Evans, by Thorpe & Gerard, his attorneys;* and that the said Letters Patent should be read with these corrections therein that the same may conform to the record of the case in the Patent Office.

Signed and sealed this 26th day of January, A. D. 1926.

[SEAL.]

WM. A. KINNAN,
*Acting Commissioner of Patents.*

Certificate of Correction.

It is hereby certified that Letters Patent No. 1,566,587, granted December 22, 1925, upon the application of David A. Evans, of Kansas City, Missouri, for an improvement in "Processes of Slaking Lime into Lime Putty," were erroneously issued to the inventor and The Evans Lime Putty Company, as assignee, by mesne assignments, of fifty-one one-hundredths of said invention, whereas said Letters Patent should have been issued to *The Evans Lime Putty Company, of Kansas City, Kansas, a Corporation of Kansas, as assignee, by direct and mesne assignments,* of the *entire interest* in said invention; in the drawings, Sheet 2, at the bottom, for the signatures insert *Inventor, David A. Evans, by Thorpe & Gerard, his attorneys;* and that the said Letters Patent should be read with these corrections therein that the same may conform to the record of the case in the Patent Office.

Signed and sealed this 26th day of January, A. D. 1926.

[SEAL.]
WM. A. KINNAN,
*Acting Commissioner of Patents.*